July 27, 1965  J. H. KAUFFMAN  3,197,261
SYSTEM FOR FEEDING AND TRANSPORTING MATERIALS
Filed March 9, 1964  6 Sheets-Sheet 1

INVENTOR
JOHN H. KAUFFMAN
BY Mason, Kolehmainen,
Rathburn & Wyss.
ATTORNEYS

July 27, 1965   J. H. KAUFFMAN   3,197,261
SYSTEM FOR FEEDING AND TRANSPORTING MATERIALS
Filed March 9, 1964   6 Sheets-Sheet 3

INVENTOR
JOHN H. KAUFFMAN
BY Mason, Kolehmainen,
Rathburn & Wyss.
ATTORNEYS

INVENTOR
JOHN. H. KAUFFMAN
BY *Wason, Kolehmainen,
Rathburn & Wyss.*

ATTORNEYS

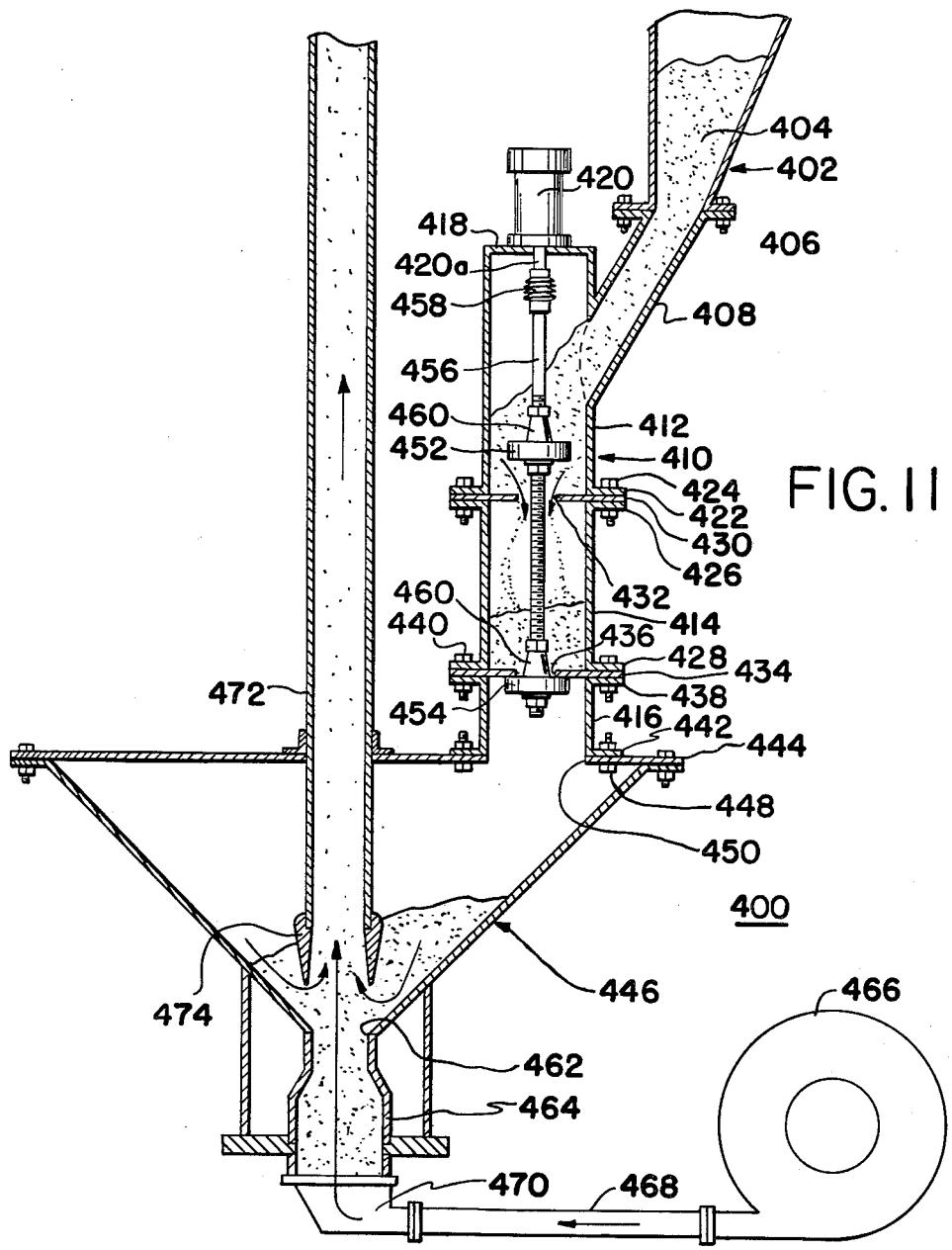

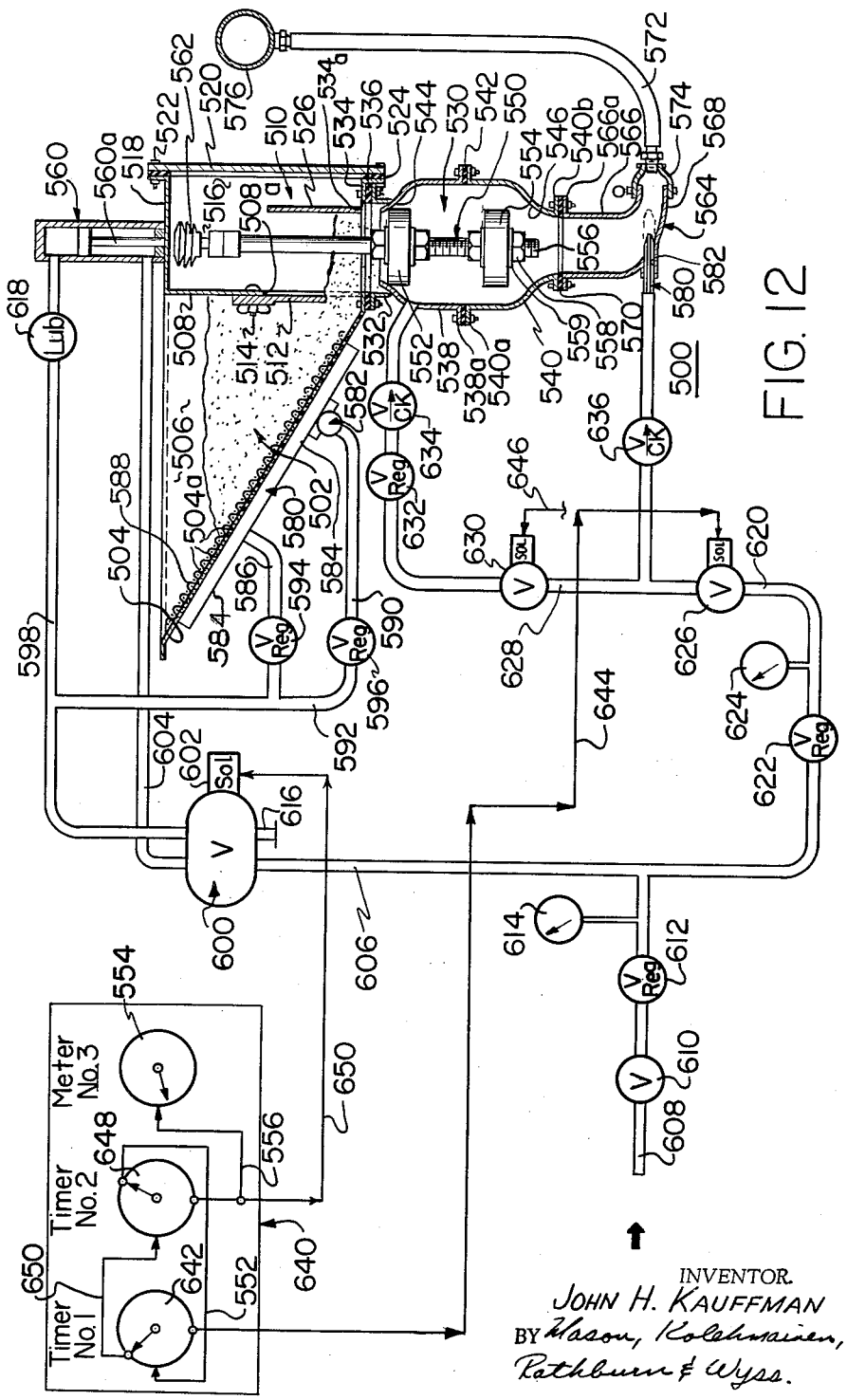

United States Patent Office 3,197,261
Patented July 27, 1965

3,197,261
SYSTEM FOR FEEDING AND TRANSPORTING MATERIALS
John H. Kauffman, Crystal Lake, Ill., assignor to Herbert Simpson Corporation, Chicago, Ill., a corporation of Illinois
Filed Mar. 9, 1964, Ser. No. 350,162
5 Claims. (Cl. 302—55)

The present application is a continuation-in-part of the copending application Serial No. 226,339, filed September 26, 1962, and assigned to the same assignee as the present application.

This invention relates to a system for feeding and transporting materials and is more particularly concerned with a system for feeding materials at a metered flow rate and transporting the materials thus metered to various locations.

An object of the present invention is to provide a new and improved system for feeding and transporting materials which is simple and economical in operation and construction, and one which will readily handle a variety of different materials.

Another object of the invention is to provide a new and improved system for feeding and transporting materials in which the materials are fed and transported at a metered rate which is easily adjustable to handle a variety of different materials at a variety of different metering rates.

Another object of the invention is to provide a new and improved system for feeding and transporting materials in which abrasive materials, such as sand, grit and the like, can be handled with a minimum of wear and abrasion on the system.

Another object of the invention is to provide a new and improved system for feeding and transporting materials in which solid materials are fed at a metered rate into a fluid flow for transportation to various locations.

Another object of the invention is to provide a new and improved system for feeding and transporting materials in which solid materials are fed at a metered rate which is relatively constant and in which the materials being fed are prevented from bridging or building up and causing the flow to stop or the rate to change a substantial amount.

Another object of the invention is to provide a new and improved system for feeding and transporting materials in which solid materials, such as sand, grit, powder and the like, are fed at a metered rate into a pneumatic transport duct having a pressure different from the feed hopper containing the materials.

Another object of the invention is to provide a new and improved feeder which can be utilized to feed materials into or out of a pneumatic transport duct from an area of low to relatively high pressure or vice versa while maintaining a relatively constant rate of flow for a variety of materials and a variety of different flow rates.

A further object of the present invention is the provision of a new and improved feeder for feeding solid material into a pneumatic transport duct which includes reciprocally movable valve means in a valve chamber and a controllable pneumatic feed means adjacent the discharge end of the chamber for moving the discharged material from the valve chamber into the duct at a controlled rate of flow.

A still further object of the present invention is the provision of a new and improved feeder of the type described in the preceding paragraph wherein means are provided for moving the valve means and operating the pneumatic feed means in selected synchronous relation with one another in order to provide a more constant rate of flow of material into the transport duct.

Yet another object of the present invention is the provision of a new and improved feeder for delivering solid materials into a pneumatic transport system wherein there are provided reciprocally movable valve means in a valve chamber and pneumatic nozzle means adjacent the discharge end of the valve chamber for feeding material discharged from the chamber into the system at an even flow rate which is adjustable from very small flow rates in the order .1 lb. per hour through a wide range to high flow rates in the order of several thousand pounds per hour.

The foregoing and other objects of the present invention are accomplished by providing a system for feeding and transporting materials including a flow duct having a fluid flow therethrough. A hopper is provided for containing the materials to be fed and transported, and this hopper is connected to the flow duct through a valve chamber. The chamber is provided with a pair of opposed valve seats and a valve member is reciprocally mounted in the chamber which moves to alternately seat against first one valve seat and then the other. Means are provided to reciprocate the valve means to accomplish this alternate seating to allow the material to flow from the hopper into the chamebr when the valve member is seated against one seat and then from the chamber into the flow duct when the valve member is seated against the other seat.

According to another embodiment of the invention, the valve chamber is provided with three seats and a valve member is movably mounted therein to alternately seat first against one seat allowing material to flow from the hopper into one portion of the chamber and from another portion of the chamber into the flow duct and then against the other two seats for allowing the material to flow from one portion of the chamber to the other portion thereof.

A further embodiment of the invention comprises a valve chamber having four seats which define three subchambers with a valve member movably mounted therein to alternately seat first against two of the seats to allow material to flow from the hopper into the first subchamber and the material in the first subchamber to flow from the second subchamber into the third and then to seat against the other two seats to allow material to flow from the first subchamber into the second and material in the third subchamber to flow into the flow duct.

In yet another embodiment, a valve chamber is provided with four seats which define three subchambers and contain a pair of individually controlled movably mounted valve members. One valve member is independently controllable to alternately seat first against a first seat to allow material to flow into a first subchamber from the hopper and then to seat against a second seat to allow material to flow from the first subchamber into a second subchamber. The other valve member is independently controllable to alternately seat first against the third seat to allow material to flow from the second subchamber into a third subchamber and then to seat against a fourth seat to allow the material to flow from the third subchamber into the flow duct.

In still another embodiment of the invention there is provided a feed hopper for solid material with a discharge outlet at the bottom thereof and a valve chamber of the type described disposed at the outlet of the hopper. Within the valve chamber is provided a reciprocally movable valve member having upper and lower valve elements which are movable to seat alternately against upper and lower seating surfaces in the chamber. Below the discharge end of the chamber there is provided an elbow fitting, the outlet of which is connected to the transport system. Slidably positioned within the fitting and coaxially aligned with the outlet thereof, there is provided pneumatic nozzle means for directing a high velocity air stream into the material as it is discharged from the valve chamber to feed the material into the transport system at an even flow rate. Means are provided for actuating the reciprocal valve member and controlling air flow to the nozzle means in a selected synchronous relationship with one another to provide for an even flow of material into the system at a desired flow rate which may be selected from a broad range in order to handle a variety of materials at a variety of different rates.

The speed of reciprocation as well as the time duration that the valve member is seated on either seat of the feeder mechanisms described above can be easily and automatically controlled and adjusted to regulate the flow of a variety of different materials under a variety of different operating conditions.

Other objects and advantages of the present invention will become apparent from the following detailed description when taken in conjunction with the drawings in which.

FIG. 11 is a sectional, elevational view of yet another embodiment of a material feeding and transporting device characterized by the features of the present invention; and FIG. 12 is a sectional, elevational view of yet another embodiment of a material feeding device of the present invention which includes pneumatic nozzle means for effecting a more even flow rate of material into the transport duct. Portions of FIG. 12 are shown in schematic form to more clearly illustrate the means for actuating the device.

Figure 1:
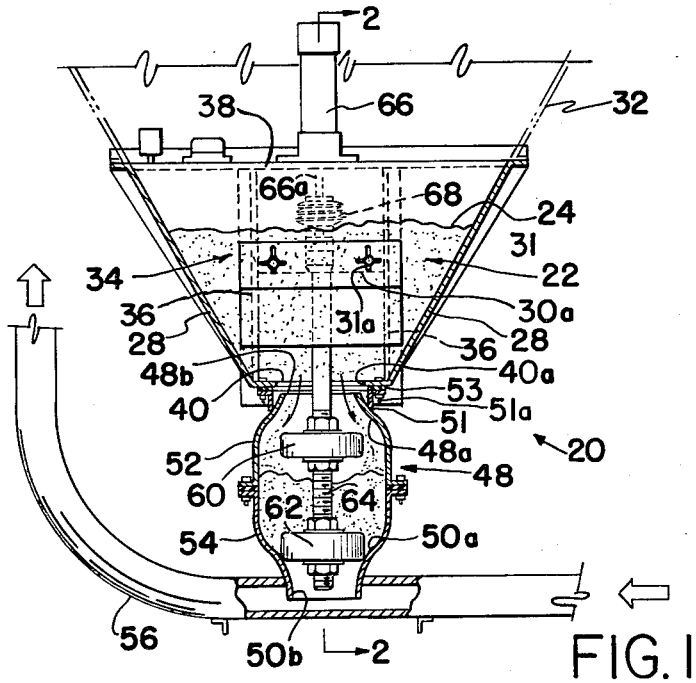
FIG. 1 is a sectional, elevational view of a material feeding and transporting device as characterized by the features of the present invention with the sectional portions taken substantially along line 1—1 of FIG 2.
Figure 2:
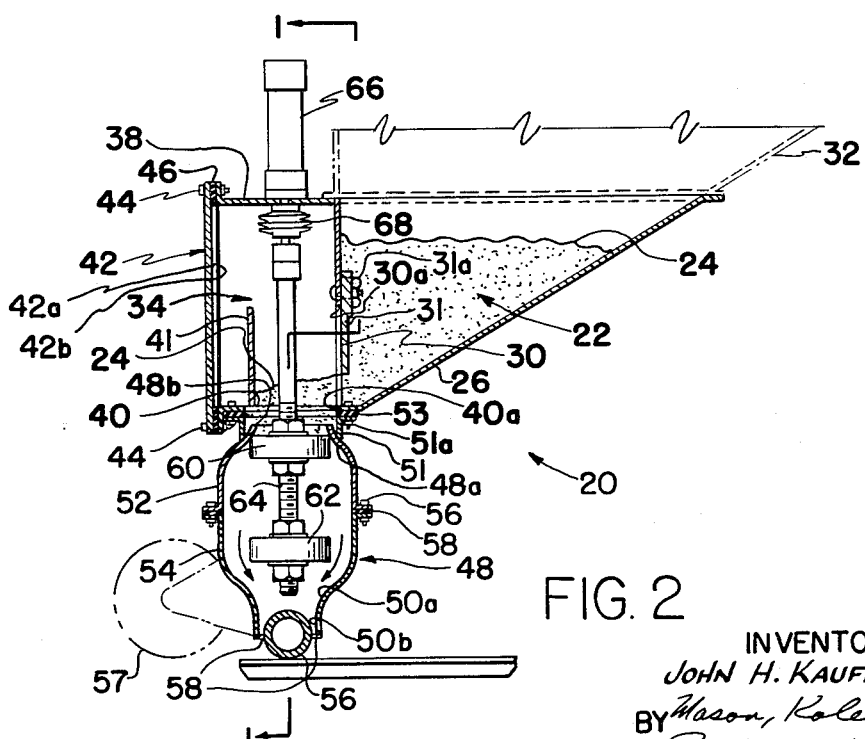
FIG 2 is a secional view taken substantially along line 2—2 of FIG. 1.

Referring now to the drawings and particularly FIGS. 1 and 2, there is illustrated one form of a material feeding and transporting system as characterized by the features of the present invention and indicated generally by the reference numeral 20. The material feeding system 20 includes a hopper 22 for holding a quantity of material 24 which is to be fed and transported by the system. The hopper 22 is provided with a sloping bottom wall 26, a pair of sloping side walls 28 and a vertical front wall 30. The walls may be joined together to form the hopper in a conventional manner such as welding or flange and bolt construction. If greater hopper capacity is desired for holding larger quantities of material, a large hopper 32 can be attached to the top of the hopper 22 in a conventional manner, such as by welding or bolts and flange construction.

Adjacent the center portion of the front wall 30 of the hopper 22, there is provided a generally rectangular feeding chamber 34. The feeding chamber 34 is formed by the front wall 30 of the hopper 22, a pair of vertical side walls 36, a top wall 38, a bottom wall 40 and a front vertical wall 42. The front wall 42 is comprised of an outer expanded metal screen 42a and an inner cotton filter or vent cloth 42b which will pass air but retain the material or may be of solid material such as clear plastic when the chamber 34 is either pressurized or evacuated as required in some types of systems. The front edges of the side walls 36, the top wall 38 and the bottom wall 40 are provided with flanges to which the front wall 42 is bolted by means of the bolts 44 so that the front wall can be easily removed for cleaning out the chamber when necessary. A gasket 46 is provided between the front wall 42 and the flange to effect a material tight seal therebetween.

The front wall 30 is provided with an opening or cutout 30a at the bottom central portion thereof so that material in the hopper 24 will readily flow into the feeding chamber 34 for feeding into the system. There is also provided on the front wall 30 a slidable gate 31 which is attached to the wall 30 by means of slots in the gate and bolts and wing nuts 31a so that this gate may be adjusted as desired to vary the size of the opening as required for different systems. The bottom wall 40 may be integrally formed with the wall 26 of the hopper 22 or attached thereto in a conventional manner, such as by welding. The bottom wall 40 of the feeding chamber 34 is provided with a feed opening 40a through which material flows into a valve chamber 48.

There is also provided an internal baffle plate 41 which prevents the material from flowing directly from the opening in the wall 30 against the front wall 42 and thus allows air from the valve chamber 48 to flow freely up through the opening 40a in the bottom on the outer side of the baffle plate 41 to escape out the front wall 42 if so desired.

The valve chamber 48 is attached to the bottom wall 40 in coaxial relation to the opening 40a thereof by means of rolled angle ring 51 and a plurality of bolts 51a. A gasket 53 is positioned between the horizontal flange of the angle ring 51 and the bottom wall 40 to provide a sealt therebetween and to isolate the hopper and feeding chamber from some of the vibrations present in the valve chamber when the system is in operation.

The valve chamber 48 is substantially cylindrical in its mid portion and is provided with inwardly converging walls at its upper end which provide a generally conical seating surface 48a and terminate to form a feed opening 48b which is of smaller diameter than the cylindrical portion adjacent the middle of the chamber. The lower end of the chamber 48 is also provided with inwardly converging walls which provide a generally conical lower seating surface 50a and terminate to form a lower discharge opening 50b which is smaller in diameter than the mid cylindrical portion of the chamber.

For ease in construction and to facilitate the cleaning of the chamber 48, it is constructed of an upper member 52 and a lower member 54 which are provided with flanges and are held together by a plurality of bolts 56. A gasket 58 is provided between the flanges of the members 52 and 54 to provide a seal therebetween. The upper member 52 is joined to the vertical flange of the angle ring 50 by welding or other suitable means. The lower end of the valve chamber 48 is attached to a flow duct 56 so that material may be fed from the chamber into the duct through the opening 50b. Depending upon the relative diameters of the opening 50b and the duct 56, an opening of the proper size is cut into the duct and bottom plates 58 are provided so that an airtight connection between the inside of the chamber 48 and the inside of the duct 56 is obtained.

Within the chamber 48 there are provided a pair of coaxial, parallel aligned upper and lower valve disks 60 and 62. The valve disks are positioned on an axially aligned threaded rod 64 so as to move together as a unit. The disks are constructed of resilient material such as hard rubber and are secured in position on the rod relative to each other by means of washers and nuts on each side of the disks. When the rod 64 is in its upper position as shown in FIG. 2, the upper disk 60 is seated against the surface 48a of the valve chamber and the lower disk 62 is spaced upwardly from the lower seating surface 50a of the chamber. In this position, the chamber 48 is sealed off from the feeding chamber 34 but is open to the duct 56. When the rod 64 is in the lower position as shown in FIG. 1, the upper disk 60 is below the seating surface 48a of the chamber and the lower disk 62 is seated against the lower seating surface 50a of the chamber. In this position the chamber 48 is open to the feeding chamber 34 and is closed to the duct 56. The spacing of the valve disks 60 and 62 from each other can easily be changed from time to time to compensate for wear on the disks and seating surfaces and to adjust the travel distance of the rod necessary to alternately seat the disks by loosening the nuts holding the disks on the rod. Similarly, the disks can also be rotated to compensate for uneven wear on their peripheries.

When the disks are in the position shown in FIG. 1, material flows into the chamber 48 from the feeding compartment 34 but cannot flow from the chamber 48 into the duct 56. The rate of flow is dependent upon a variety of factors including the flowability of the material itself, the size of the opening 48b, the density and particle size of the material, the difference in pressure between the chamber 48 and feeding compartment 34, the distance the valve disk 60 is moved from its seated relation and the time interval that the disk is open. When the disks are in the position shown in FIG. 2, the material in the feeding compartment 34 cannot flow into the chamber 48 but the material accumulated in the chamber 48 flows out the opening 50b into the duct 56 and is transported in the duct to the desired location. The rate of the flow is dependent upon a variety of factors including the amount of material in the chamber when the disk 62 is open, the flowability of the material itself, the size of the opening 50b, the size of the duct 56, the pressure differential between the chamber 48 and duct 56, the distance the valve disk 62 is moved from its seated relation and the time interval that the disk is open.

Figure 10:
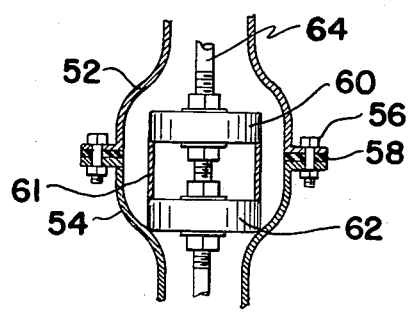
FIG. 10 is a sectional, elevational view of a feeding chamber similar to the one shown in FIGS. 1 and 2 but utilizing a modified valve mechanism.

If it is desired to reduce the rate of flow of a given size mechanism, a cylindrical wall 61 can be inserted between the upper and lower valve disks 60 and 62 as is shown in FIG. 10 of the drawing. The cylinder 61 decreases the effective volume of the chamber 48 and prevents a build-up of material between the valve disks which might otherwise occur.

One of the most important factors in the feed rate of the mechanism is the amount of time intervals in which the disks are in the up and down position. It has been found by experiment that a large difference in feed rates for a given size chamber and given material can be obtained by varying the time intervals in the up and down positions. It has also been found that better flow is obtained by utilizing a high speed of valve movement limited, of course, so that inertia forces do not become great enough to be destructive to the mechanism. The feed mechanism can be utilized to feed materials into the duct 56 when the pressure in the duct is both below and above the pressure in the hopper 22 with good results.

If the pressure in the duct 56 is greater than in the hopper 22, a small amount of air will flow upward into the hopper during the up or down movement of the disks. However, the amount is small because of the rapid speed of movement of the disks and the compaction of the material over or under the disks between the seat forming a temporary seal. However, the majority of this air flow will take place at the path of least resistance which is to the left of the baffle 41 as viewed in FIG. 2 since there is little or no accumulation of material at this point because of the action of the baffle. This air then passes out through the front wall vent cloth 42b and the expanded metal screen 42a to the atmosphere. Some of the vibrations of the mechanism are transmitted to the hopper 22 and feeding compartment 34 and this aids the material to flow freely as well as prevents bridging and build-up of materials. When the pressure in the duct 56 is less than in the hopper 22, the small amount of air flow into the duct similarly aids the material to flow.

The utilization of resilient valve disks alternately seating on generally conical seating surfaces provides a highly successful feeding mechanism that will handle even the grittiest and most abrasive material with a minimum of wear on the mechanism. Furthermore, it has been found that a vibratory feeder of this type can operate at much higher feed rates than other types of feeder mechanisms.

Furthermore, a larger range of feed rates for a variety of different materials can be readily obtained by varying the time intervals that the disks are in the up and down positions. It is to be noted that the time in the up or in the down position does not necessarily have to be equal. For normal operations the period of dwell in the up and down positions can be approximately equal. As an example, it was found that in feeding granular bentonite from atmospheric pressure into an air stream of 4 p.s.i.g., the dwell in the down position of 10 secs, and in the up poistion of 2 secs. produced a high feed rate and that by extending the time interval in the down position the feed rate is decreased. Some materials feed best with a slow cycle while others work best at a rapid cycle. Valve movement average velocities in the range of 40 to 100 f.p.m. have been utilized to good advantage. Also the novel construction of the mechanism is practically self-cleaning and requires very little maintenance because of the vibration and the use of flexible disks alternately seating on substantially conical seats. For ease in moving the feeding mechanism from one place to another, a pair of rollers 57 shown in dotted lines in FIG. 2 may be provided.

In order to provide for the up and down reciprocation of the rod 64 and the valve disks, the upper end of the rod 64 is connected to a piston rod 66a of an air cylinder 66 by means of the flexible coupling 68. The coupling 68 allows the lower end of the rod 64 to be laterally flexible enough to provide good seating of the disks 60 and 62 and also serves to reduce the shock of the cylinder 66 when the valve disks seat. The cylinder 66 is mounted on the top wall 38 in axial alignment with the opening 40a in the bottom wall and the valve chamber 48.

Figure 3:
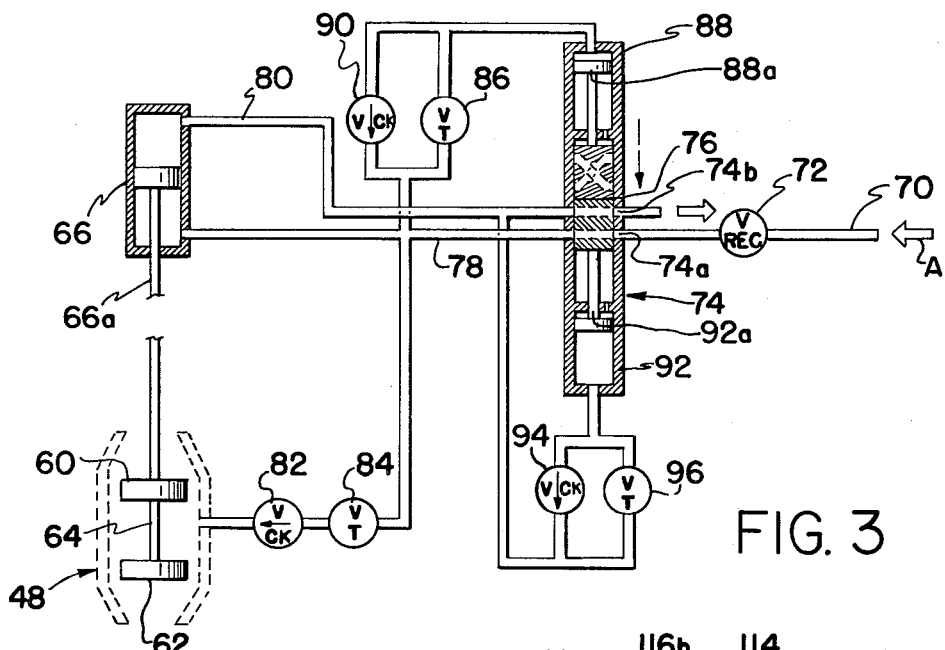
FIG 3 is a schematic diagram of one embodiment of a mechanism for reciprocating the valve disks of the material feeder of FIG. 1.

One system of actuating the cylinder 66 to produce controlled movement of the rod 64 and alternate seating of the disks 60 and 62 is illustrated schematically in FIG. 3. This system is operated by compressed air and requires no electrical power and, hence, is useful in a variety of field locations where power is not readily available.

Compressed air from an air compressor or other source is connected to the inlet line 70 at the arrow A. The line 70 is provided with a regulator and pressure reducer valve 72 to regulate the pressure to the system and control the speed of movement of the piston in the cylinder 66. The inlet line 70 is connected to the inlet port 74a of a sliding type 4-way reversing valve 74. The valve 74 is provided with a sliding valve member 76 having a plurality of different passages for directing the air flow to reverse the direction of movement of the piston rod 66a in the cylinder.

When the valve member 76 is positioned as shown in FIG. 1, compressed air from the inlet port 74a is directed to the upside end of the cylinder 66 through the line 78 causing the piston rod 66a to move rapidly upward, the speed of movement depending on the setting of the regulator valve 72. Air in the downside of the cylinder 66 is forced out through the line 80, a passage in the valve member 76, and out the exhaust port 74b to the atmosphere.

During this time, high pressure air from the line 78, is directed to the inside of the valve chamber 48 to aid in flushing the material out into the duct 56. A check valve 82 is provided to prevent back flow of air and material into the system from the chamber 48 and a throttle valve 84 is provided to control the rate of air flow into the chamber 48 and consequently control to a certain extent the rate of feeding of the material from the chamber 48 into the duct 56. High pressure air is also directed from the line 78 through a throttling valve 86 into a cylinder 88 having a piston and rod 88a connected to one end of the slide member 76 of the valve 74. A check valve 90 is provided in parallel with the valve 86 so that air flow from the line 78 to the cylinder 88 can be controlled by regulation of the throttle valve 86. A cylinder 92 and piston and rod 92a are also provided at the other end of the valve 74 with the rod 92a being connected to the other end of the sliding valve member 76. The cylinder 92 is connected to the line 80 through a check valve 94 and throttling valve 96. When the valve member 76 is positioned as shown in FIG. 3, air in the cylinder 92 can exhaust through both the check valve 94 and throttling valve 96, the line 80, and out through a passage in the valve member 76 and exhaust port 74b.

The valve 74 is of the type commonly referred to as the stick-slip type which requires a greater force to initially move the sliding member 76 than it requires to keep the member moving after it has started moving. Consequently, with the member 76 in the position shown in FIG. 3, the pressure in the cylinder 88 gradually builds up at a rate controlled by the setting of the throttle valve 86 until the pressure difference between the cylinder 88 and the cylinder 92 is sufficient to cause the valve member 76 to slide rapidly downwardly to reverse the direction of air flow to the cylinder 66.

When this happens, high pressure air is directed to the line 80 causing the piston rod 66a to move rapidly downward and seat the lower valve disk 62. The air in the lower end of the cylinder 66 passes through the line 78, through a passage in the valve member 76 and out the exhaust port 74b to the atmosphere. The high pressure air in the line 80 is then directed into the cylinder 92 at a rate controlled by the throttling valve 96 and air in the cylinder 88 is exhausted to atmosphere through both the check valve 90 and throttling valve 86 until the pressure difference between the cylinder 92 and the cylinder 88 is sufficient to overcome the sticking force in the valve 74 and cause the valve member 76 to slide rapidly upward and reverse the pressure flow to the cylinder 66 and start another cycle of operation.

Thus, the control system illustrated in FIG. 3 provides a means for actuating the cylinder 66 in order to move the rod 64 up and down and alternately seat the valve disks 60 and 62. The rate of movement of the rod and valve disks is easily controlled by the pressure regulator valve 72. The time interval during which the rod and valve disks are in the up position is readily controlled by the throttling valve 86 and the time interval in which the rod and valve disks are in the down position is controlled by the throttling valve 96. The throttling valve 84 controls the rate of material flow from the chamber 48 into the duct.

Figure 4:
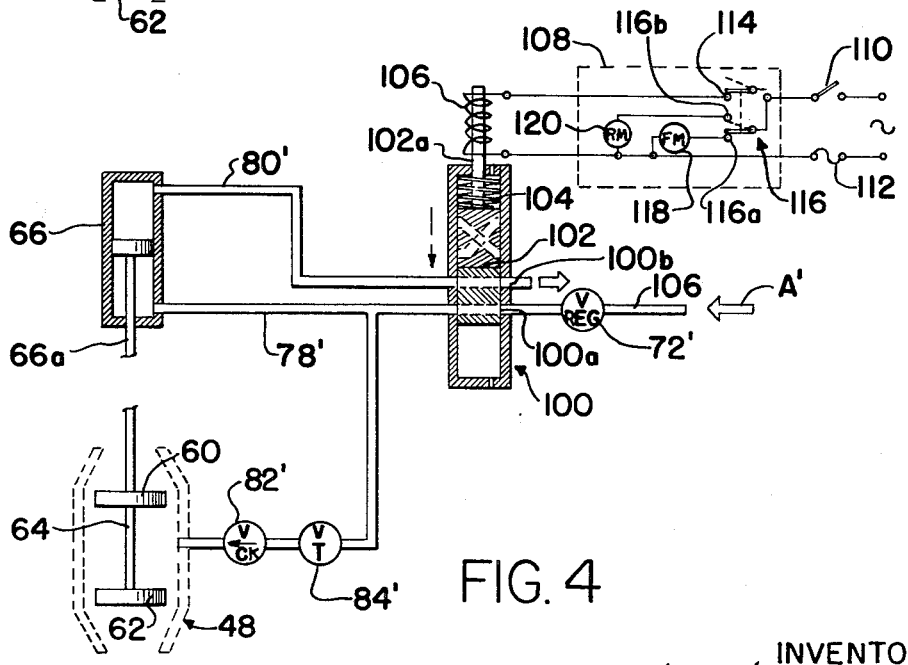
FIG 4 is a schematic diagram of another embodiment of a mechanism for reciprocating the valve disks of the material feeder of the present invention.

Another system for actuating the cylinder 66 to reciprocate the rod and valve disks is schematically illustrated in FIG. 4 of the drawing. In this system a solenoid controlled, spring return, 4-way air valve 100 is used to revise the air pressure flow to the cylinder 66. The valve 100 is provided with a sliding valve member 102 having a plurality of passageways therein and a return spring 104 which normally biases the member 102 in the down position. Air under pressure from an air compressor or other source is connected to an inlet line 106 at the arrow A'. The line 106 is connected to an inlet port 100a of the valve 100 and a pressure regulator valve 72' is provided to control the inlet pressure and function similarly to the valve 72 of the system shown in FIG. 3. The high pressure air from the inlet port 100a goes through a passage in the sliding valve member 102 to the line 78' which is connected to the cylinder 66 to raise the rod and valve disks to the up position. High pressure air is also directed from the line 78' to the throttle valve 84' and check valve 82' which function in the same manner as described previously for the valves 82 and 84 of FIG. 3 and thence to the chamber 48 to flush it out. Air in the upper end of the cylinder 66 passes through the line 80', a passage in the sliding valve member 102 and out an exhaust port 100b of the valve 100. The valve member 102 is provided with a rod 102a of magnetic material. A solenoid coil 106 is connected when energized to exert a pull on the valve member 102a, pulling the sliding valve member 102 upward to the position shown in FIG. 4 against the force of the return spring 104. When the coil 106 is deenergized the spring 104 moves the member 102 downward so that the inlet port 100a is in communication with the line 80' and the exhaust port 100b is in communication with the line 78'. Thus, if an electrical power failure should occur, the valve member 102 would move downward under the force of the spring 104 directing high pressure air to the line 80' and move the rod and valve disks to the down position to shut off any material flow from the chamber 48 to duct 50. The coil 106 is energized and deenergized for controlled intervals of time by means of an electric power source (not shown) through the on-off switch 110, fuse 112, and timer 108.

Referring now to the timer 108, when the feeding device is to be placed in operation, the main switch 110 is operated to a closed condition so that a circuit is completed through a normally closed pair of contacts 114 in the timer 108 to energize the winding 106 of the solenoid. This shifts the valve assembly 100 to the position shown in FIG. 4 in which compressed air is applied to the lower end of the piston 66 to elevate the valve disks to the up position. The closure of the switch 110 also completes a circuit through a pair of normally closed contacts 116a in a switch 116 in the timer 108 to complete an energizing circuit for a forward drive motor 118 included in the timer 108. When the timer motor 118 is energized, cam means connected thereto are driven in a forward direction to initiate that timed interval that the valve assembly 100 is held in its operated condition.

After a predetermined period of time, the cam means driven by the motor 118 opens the normally closed contacts 114 and 116a and closes a pair of normally open contacts 116c in the switch 116. The opening of the contacts 114 interrupts the energizing circuit for the winding 106 so that the compression spring 104 restores the valve assembly 100 to its alternate condition in which compressed air is supplied to the upper end of the piston 66. This operates the valve disks to their alternate or down position. The opening of the contacts 116a terminates the energization of the forward drive motor 118, and the closure of the contacts 116b energizes a reverse drive motor 120 that also forms a part of the timer 108. The motor 120 drives the cam means in a reverse direction.

After a predetermined period of time, the cam means now being driven by the reverse drive motor 120, advances to a position in which the contacts 114 and 116a are again closed and the contacts 116b are opened. The closed contacts 114 again energize the winding 106 to operate the valve assembly 100 to its illustrated position. The closing of the contacts 116a energizes the motor 118, and the opening of the contacts 116b stops the motor 120. Thus, the time intervals during which the valve disks are either in the up position or down position can be controlled by setting the timer 108 and a variety of desired time intervals can be easily obtained. The operation of the feeding device is terminated by opening the main switch 110.

Thus, the timer 108 energizes the solenoid coil 106 for an adjustable period of time causing the valve member 102 to direct period to the line 78' to move the rod and valve disks to the up position and remain there for the timed interval. The timer then deenergizes the solenoid and the spring 104 moves the valve member to the downward position directing high pressure to the line 80' to move the rod and valve to the down position for a timed interval until the solenoid 106 is again energized to repeat the cycle.

Figure 5:
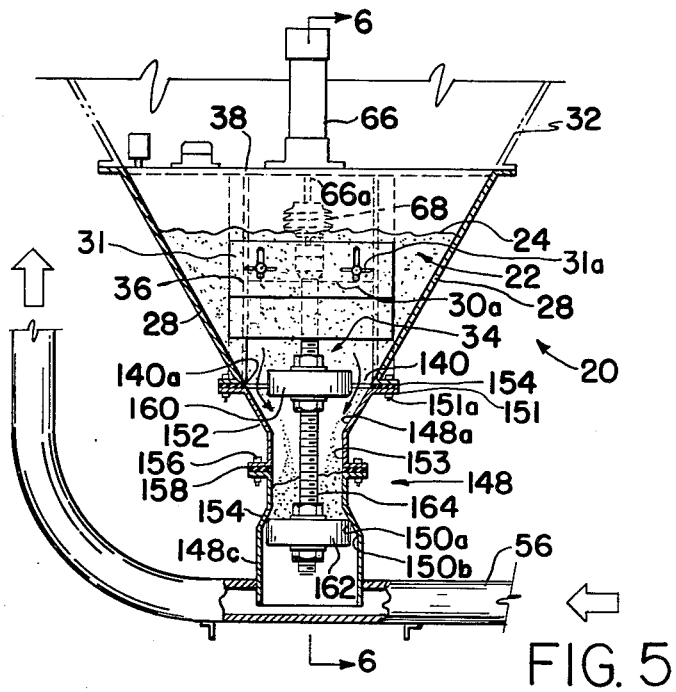
FIG 5 is a sectional, elevational view of another embodiment of the present invention with the sectional portions taken substantially along line 5—5 of FIG. 6.
Figure 6:
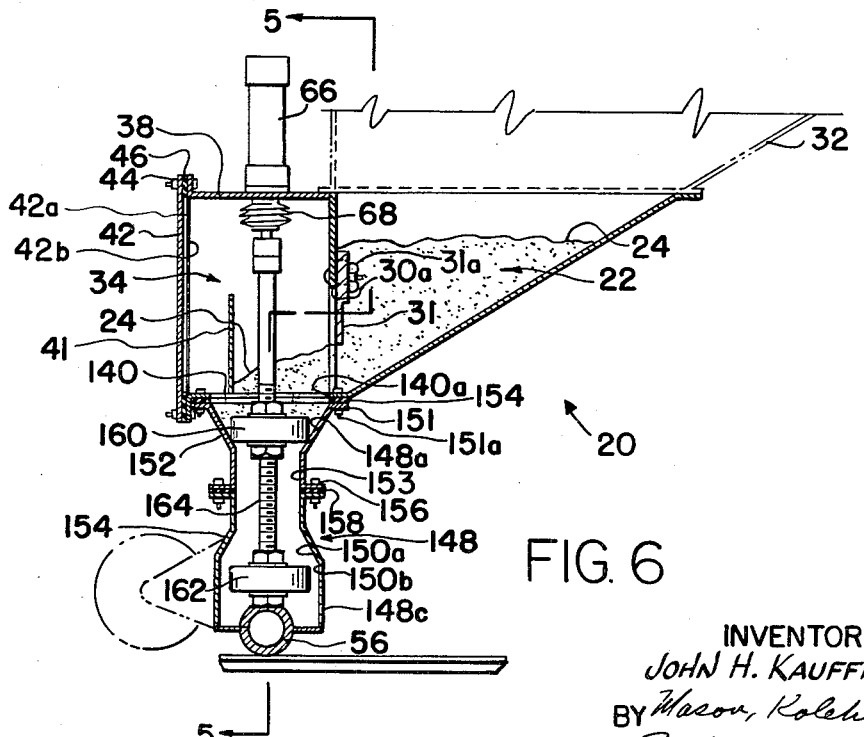
FIG. 6 is a sectional view taken substantially along line 6—6 of FIG. 5.

Referring now to FIGS. 5 and 6 of the drawings, there is illustrated another embodiment of the present invention having a different valve chamber and valve disk arrangement. The material hopper and feeding compartment are essentially the same as shown in the embodiment of FIGS. 1 and 2 and have been given similar reference numerals where the parts are similar or identical.

The bottom wall 140 of the feeding compartment 34 is provided with a somewhat larger feed opening 140a which communicates with the upper end of a valve chamber 148. The upper end of the valve chamber 148 is provided with outwardly sloping walls forming a generally conical upper valve seating surface 148a. The upper end of the walls are terminated in a radial flange 151 which is attached to the bottom wall 140 of the feeding compartment 34 by means of the bolts 151a. A gasket 154 is interposed between the bottom wall 140 and the flange 151 to provide a seal therebetween. The walls forming the lower portion of the chamber 148 taper outwardly to form a generally conical lower valve seating surface 150a. The seating surfaces 148 and 150a are joined together by a generally cylindrical middle portion 153 which is smaller in diameter than the valve disks 160 and 164. The lower end of the lower tapered seating surface 150a forms an outlet opening 150b which communicates with the interior of the duct 56 by means of the cylindrical chamber extension 148c. The complete chamber 148 is formed of an upper member 152 and a lower member 154. These members are joined together adjacent the mid-portion 153 of the chamber by means of the flange and bolt connection 156 and the gasket 158.

The upper valve disk 160 and lower valve disk 162 are secured on the threaded valve rod 164 by means of the nuts and washers so that they may be adjusted and properly spaced so that they will seat alternately on the surfaces 148a and 154a, respectively, as the rod 164 is moved down and up. The upper end of the rod 164 is connected to the cylinder rod 66a of the cylinder 66 by means of the coupling 68 and actuating system as illustrated in FIGS. 3 and 4 and as previously described are utilized to provide the reciprocating movement desired.

It has been found that the embodiment of the invention illustrated in FIGS. 5 and 6 and just described works better with certain materials and that the embodiment of FIGS. 1 to 3 works better with others. When the lower valve disk 162 is seated against the lower seating surface 150a, as shown in FIG. 5, the flow of material in the valve chamber 148 to the duct 56 is stopped and material in the feeding compartment 34 flows into the chamber 148 around the upper valve disk 160 through the opening 140. Of course, the rate of this flow is dependent on the same factors, some of which were previously mentioned in connection with the first embodiment.

The rod 164 and valve disks 160 and 162 are then moved rapidly downward by the cylinder 66 under actuation of a system such as shown in FIG. 3 or 4 until the upper valve disk 160 is seated against the surface 148a closing off the flow into the chamber 148 from the feeding compartment 34. The lower valve disk 162 is then away from the seat and material flows from the chamber 148 into the duct 56 at a rate determined by many factors including the ones previously mentioned in connection with the first embodiment.

Air leakage between the feeding compartment 34, the valve chamber 148 and duct 56 during the up and down movements of the rod and valve disks is minimized by the rapid movement of the disks as well as compaction of the material above and below the disks. If the air pressure in chamber 148 is greater than it is in the feeding compartment 34 and hopper 22, a small amount of air will flow upward from the chamber into these areas. As before mentioned, the majority of this flow will take place to the left of the baffle 41 which is the path of least resistance and will then pass out to the atmosphere through the cotton vent cloth 42b and expanded metal screen 42a. By adjusting the intervals of time during which the valve disks remain in either the up or down position, the flow rate can be accurately controlled. Also, the disks can be moved at a high speed because of the cushioning action of the valve disks as they are seated alternately. Additionally, the vibrations caused by the rapid reciprocal movement of the valve mechanism aid in preventing materials from bridging or building up in the valve chamber itself, the feeding compartment, and the upper valve disk.

To aid in flushing the material into the duct 56 from the chamber 148, an air line is connected to the interior thereof in a manner shown in FIGS. 3 and 4 with the slight difference in connection in that the flushing line is connected to the line 80 or 80' instead of 78 or 78' so that the flushing air is directed into the chamber 148 when the rod and valve disks are in the down position, as illustrated in FIG. 6.

Figure 8:
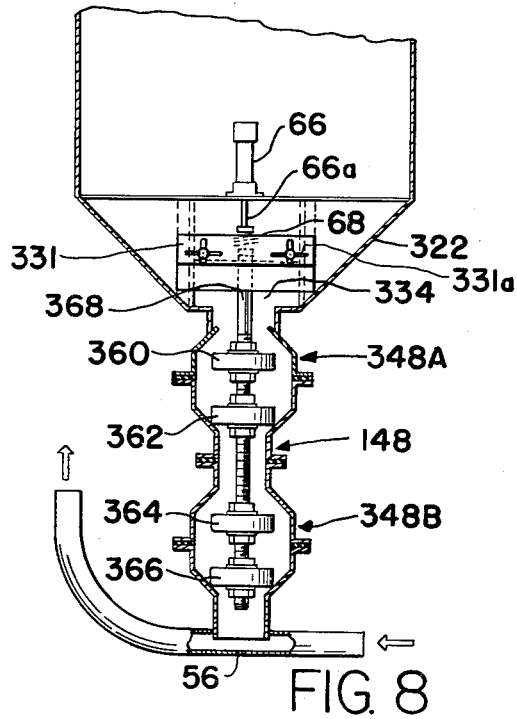
FIG. 8 is a sectional, elevational view of yet another embodiment of the present invention utilizing a quadruple valve means.
Figure 9:
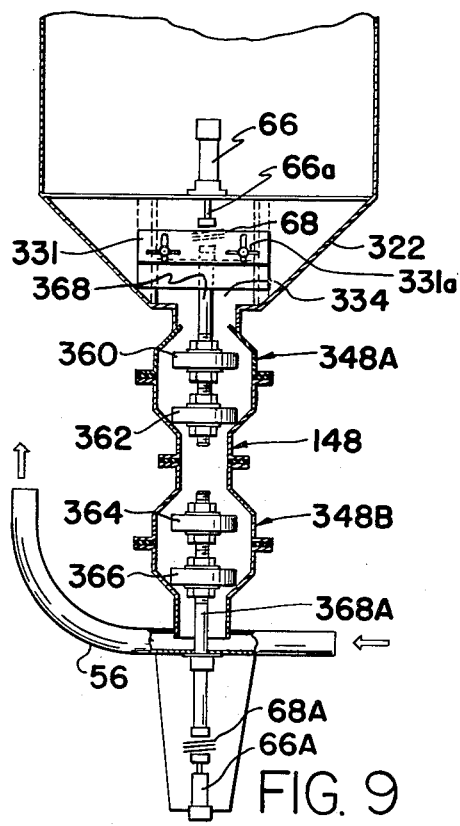
FIG. 9 is sectional, elevational view of still another embodiment of the present invention utilizing two independently controlled valve members.
Figure 7:
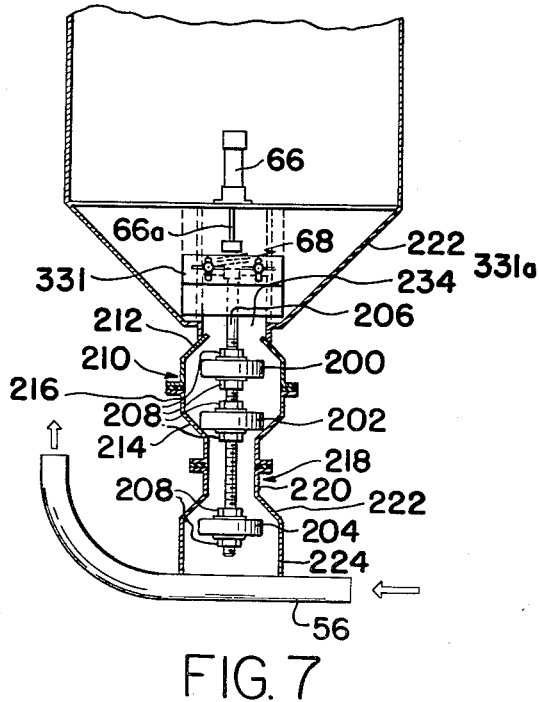
FIG. 7 is a sectional, elevational view of another embodiment of the present invention utilizing a triple valve means.

Referring now to the embodiments illustrated in FIGS. 7, 8 and 9, when it is necessary to feed material into a flow duct which is at a great pressure differential, either higher or lower than the pressure in the material hopper, it may be desirable to provide reciprocal valve mechanisms having three, four or more resilient valve disks.

FIG. 7 illustrates an embodiment having three resilient valve disks 200, 202 and 204 which are secured in concentric spaced apart relation on a reciprocating valve rod 206. The valve disks are secured on the rod in the proper spaced relation by means of the nuts and washers 208 and be adjusted to provide for proper seating of the valve disks and to compensate for wear. The upper pair of disks 200 and 202 are positioned to alternately seat in an upper valve chamber 210 in a manner similar to that described in connection with the embodiment of FIGS. 1 and 2. The chamber 210 is provided with an internal generally conical upper seating surface 212 upon which the disk 200 seats when the rod and valve mechanism is in the up position and is provided with a lower internal generally conical surface 214 upon which the valve disk 202 seats when the rod and valve mechanism is in the down position. The chamber 210 is provided with a generally cylindrical mid-portion 216 of greater diameter than the valve disks 200 and 202.

There is provided adjacent the lower end of the chamber 210 another chamber 218 which is similar in construction to the chamber 148 of FIGS. 5 and 6. The chamber 218 is provided with a generally cylindrical mid-portion 220 of a diameter smaller than the valve disks 202 and 204. The portion 220 is joined at its upper end to the lower end of the seating surface 214 and the lower end of the chamber 218 is provided with an outwardly projecting generally conical lower seating surface 222 which forms a seating surface for the valve disk 204 when the valve mechanism is in the up position. The lower end of the seating surface 222 is joined to a generally cylindrical chamber 224 having a diameter greater than the valve disk 204 so the disk can move freely therein. The lower end of the chamber 224 communicates with the interior of a flow duct 56 so that material in the chamber 218 may enter the duct and be carried away by the air stream therein when the lower valve disk 204 is in the down position, as shown in FIG. 7. Thus, the upper chamber 210 with the valve disks 202 and 204 alternately seating against the surfaces 212 and 214 is similar in construction to the embodiment of FIGS. 1 and 2 and the lower chamber 218 with the valve disks 202 and 204 alternately seating against the surfaces 214 and 222, respectively, is similar in construction and operation to the embodiment of FIGS. 5 and 6. The upper end of the upper chamber 210 is connected to the lower end of a feeding compartment 234 attached to a material feed hopper 222 in a manner similar to that described in the preceding embodiments. The upper end of the rod 206 is connected to the end of a cylinder rod 66a of an air cylinder 66 through a coupling 68 in order to provide reciprocating movement of the rod and valve disks. A system for actuating the cylinder 66 similar to those of FIGS. 3 and 4 may be utilized to control the actuation of the rod and valve disks.

When the rod and valve disks are in the down position of FIG. 7, material in the hopper 222 and feeding compartment 234 flows into the upper chamber 210 around the disk 200 but cannot flow from the chamber 210 into the chamber 218 because the valve disk 202 is seated on the surface 214. Material in the lower chamber 218 feeds into the duct 56 around the valve disk 204 which is below the seating surface 222 in this position.

The rod and valve disks are then moved to the up position rapidly and the upper disk 200 seats on the surface 212 shutting off the flow of material into the upper chamber 210 from the feed compartment 234 and also the lower disk 204 seats against the surface 222 shutting off the flow of material into the duct 56 from the lower chamber 218. Since the valve disk 202 is not seated on the surface 214 at this time, material in the chamber 210 flows into the lower chamber 218.

The flow rates of material from the feeding compartment 234 into the upper chamber 210, and from this chamber into the lower chamber 218 and then into the duct 56 for transportation in the air stream are governed by various factors including those mentioned in discussing the previous embodiments.

In applications where very light material is being fed and high pressure differentials are involved, either positive or negative, between the material hopper and the flow duct, it has been found that the embodiment illustrated in FIG. 7 works very well. Problems in feeding low density material into or out of high pressure environments are encountered because of the amount of air flow from high to low pressure when the valve disks are moving, and this is sufficient to virtually stop the flow, if in a reverse direction, and to rapidly dump a large quantity of material in the system with consequent clogging if the air flow is the same direction as the material flow.

For this reason, the use of the chamber 210 in series with the chamber 218 in a single feed mechanism provides a means for providing a series of stepped pressure gradients in which the pressure differential across any one of the valve disks is reduced so that the amount of air flow around the disk during its movement is not objectionable. Furthermore, with rapid movement of the valve disks, air in the duct 56, at high pressure for instance, does not have time enough to reach the upper disk 200 before it seats and then after the disks are seated the pressure differential in the chamber 210 bleeds off slowly into the compartment 234 without greatly reducing the downflow of material as it would if only a single valve chamber and pair of valve disks were used. In effect, the average pressures in the chambers 210 and 218 are between the pressures in the duct 56 and feeding compartment 234 and the pressure difference between any two adjacent areas in the feeding path of the material is smaller than in the case of a single feed chamber between the duct and hopper where a high pressure differential is necessary.

Referring now to FIGS. 8 and 9, where very high pressure differentials are required between the hoppers 322 and feeding compartments 334 and the flow duct 56, three valve chambers 348A, 348B and 148 have been utilized in series to further reduce the pressure differential between the adjacent areas in the path of material flow. In the embodiment of FIG. 8, four valve disks 360, 362, 364 and 366 are attached to a single rod 368 which is connected to the piston rod 66a of the actuating cylinder 66 by the coupling 68. The chamber 348A with the valve disks 360 and 362 and the chamber 348B with the valve disks 364 and 366 both are similar in operation and construction to the chamber 48 and valve disks 60 and 62 of the embodiment illustrated in FIGS. 1 and 2 and previously described. The chamber 148 with associated valve disks 362 and 364 is similar in operation and construction to the chamber 148 and disks 160 and 162 of the embodiment illustrated in FIGS. 5 and 6. The cylinder 66 may be actuated by a system of the type illustrated in FIG. 3 or 4 and previously described in the specification.

When the rod 368 and valve disks are in the down position shown in FIG. 8, material flows from the feeding compartment 334 into the upper chamber 348A. Material cannot flow from this chamber into the middle chamber 148 because the valve disk 362 is seated. Material flows from the chamber 148 into the lower chamber 348B but cannot flow therefrom into the duct.

When the rod 368 is moved to the up position by the cylinder and actuating system, material flows from the feeding compartment 334 into the upper chamber 348A, but material cannot flow from this chamber into the middle chamber 148. Material cannot flow from the chamber 148 into the lower chamber 348B, but does flow from the chamber 348B into the duct 56 for transportation in the air stream.

By placing in effect three valve chambers with valve disks which alternately seat therewith in series between the feeding compartment and the duct, it is possible to successfully feed very fine or light materials from a region of very high to very low pressure or vice versa since the pressure differential between any two adjacent areas along the path of material flow is reduced to a workable level. It has also been found that when operating at high pressure differentials between adjacent chambers that longer periods of dwell with the valve disks in the seated position are desirable when the pressure differential is counter to the direction of material flow because of a slightly longer time required to equalize the pressure before material effectively starts to flow under the effect of gravity. The converse, of course, is true when the pressure differential is with the direction of material flow to prevent dumping of large quantities of material rapidly into the system which might momentarily clog it up.

The embodiment of FIG. 9 is similar to FIG. 8 except that the lower valve disks 364 and 366 are connected to a separate rod 368A which is actuated by a separate air cylinder 66A. This construction allows greater flexibility of control of the mechanism since two separate actuation systems can be synchronized to operate the cylinders 66 and 66A.

There is illustrated in FIG. 11 another embodiment of a system for feeding and transporting materials which system is indicated generally by the reference numeral 400. This system is especially well suited for use with low pressures and is relatively simple in construction, thus making it economical to manufacture and install. The system 400 includes a material hopper 402 into which quantities of sand or other material 404 to be transported are dumped. The hopper 402 has sloping walls converging inwardly to form an outlet 406 at the bottom leading to a feed chute 408 which is connected to the outlet in any suitable manner such as by welding or by a flange and bolt construction as illustrated. The lower end of the feed chute 408 angularly intersects with a feeder unit indicated generally by the numeral 410.

The feeder unit 410 is preferably constructed of several sections of round pipe and comprises an upper section 412, an intermediate section 414, and a lower section 416. The upper section is provided with a top plate 418 for mounting an actuating cylinder 420 which has a piston rod 420a and is similar to the cylinder 66 previously described and which may be controlled by a control system such as illustrated in FIG. 3 or FIG. 4 and described above. The lower end of the section 412 is provided with a flange 422 for joining this section to the intermediate section 414 by means of bolts 424.

The intermediate section 414 is provided with upper and lower end flanges 426 and 428, respectively, with the upper flange 426 facing the flange 422 of the upper section 412. Between these two flanges there is provided an orifice plate 430 which may be constructed of steel plate and has a central flow opening or orifice 432 defined therein.

A similar orifice plate 434 having a central flow opening or orifice 436 is positioned between the lower end flange 428 of the intermediate section 414 and an upper end flange 438 of the lower section 416. These two flanges and the orifice plate 434 are held together by suitable means such as bolts 440 and the lower end of the lower section 416 is provided with a lower end flange 442 which is suitably attached, as by bolts 448, to the top plate 444 of a lower hopper 446. The top plate 444 is provided with an opening 450 aligned with the lower section 416 in order to allow material to flow into the hopper 446.

The feeder unit 410 is provided with a reciprocal valve mechanism actuated by the cylinder rod 420a comprising an upper valve disk 452 and a lower valve disk 454. These disks are preferably of resilient material such as rubber or the like and are positioned in spaced apart relation on a threaded valve rod 456 which is attached to the end of the cylinder rod 420a by means of a flexible coupling 458. The disks are secured on the rod 456 by means of nuts and washers in a conventional manner. In order to prevent a large build up of material on the upper surface of the valve disks, there are provided conically shaped collars 460 which are positioned above the disks.

The lower hopper 446 is provided with sloping side walls forming an opening 462 at the bottom of the hopper to which a vertically extending nozzle 464 is connected. The nozzle 464 is connected to a source of air pressure such as a blower 466 or the like through a pipe 468 and elbow 470. Centrally positioned within the hopper 446 and coaxial with the nozzle 464 there is provided a vertically disposed, upwardly extending flow duct 472 for transporting material to a desired location. An end collar 474 at the lower end of the flow duct 472 has tapered inner walls and is spaced vertically upward from the nozzle 464 so that high velocity air from the nozzle entrains the material in the hopper and carries it upward in the flow duct to be transported to the desired location.

In operation of the system, the material 404 in the hopper 402 flows downwardly through the feed chute 408 into the upper section 412 of the feeding device 410 and around the valve disk 452 through the orifice 432 into the intermediate section 414. The rate and amount of flow is dependent on many factors including the flowability of the material, the level or amount of material in the hopper, the size of the feed chute, upper section, valve disk and orifice diameter, and the amount and velocity of upward travel and duration of dwell in the upper position of the upper valve disk. When the valve mechanism moves downwardly the upper valve disk 452 seats on the orifice plate 430 to prevent flow from the upper section 412 to the intermediate section 414 and, at the same time, the lower disk 459 moves downwardly away from seating engagement with the lower orifice plate 434 to permit the material in the intermediate section to flow into the lower hopper 446 for transportation in the air stream. This rate of flow is likewise dependent on several factors as discussed above.

The material in the hopper 446 flows toward the bottom of the hopper where it is picked up by the air stream from the nozzle 464 and is carried up the flow duct 472. The rate of flow again is dependent on many factors including the particle size, density and flowability of the material, the amount of air pressure available from the blower, the distance between the lower collar 474 and the nozzle, and the shape of the internal surface of the collar and nozzle.

When it is desired to stop the flow, the feeder mechanism 410 is shut down with its valve disks in the position shown in FIG. 11 and the material remaining in the hopper 446 is carried out through the flow duct 472 at which time the blower 466 is shut down. When it is desired to start the flow of material, the feeder mechanism is again placed in operation and the blower is started.

As was previously discussed in connection with other embodiments the rate of flow through the feed mechanism can be accurately controlled by adjusting the time periods of dwell in the up and down positions of the valve mechanism. The use of standard round pipe and flat orifice plates makes the feeding mechanism simple and economical to construct and, while it does not possess some of the advantages of the other embodiments, the arrangement shown in FIG. 11 will work well with relatively free flowing material such as sand. Also, orifice plates having various size openings can easily and rapidly be installed in the feeding mechanism to obtain the desired flow rate. Air flow from the lower hopper 446 into the feeding mechanism when the valve disks are in transit between seating is of little consequence and is minimized by utilizing high velocity movement of the valve mechanism.

Referring now to FIG. 12 there is illustrated yet another embodiment of a feeding device constructed in accordance with the features of the present invention and indicated generally by the reference numeral 500. The device 500 is designed to feed a variety of different materials at a wide range of flow rates encompassing minimum flow rates as low as 0.1 lb. per hour. The device will deliver material at relatively constant flow rates over a wide range of values and is extremely useful in providing an even flow of material wherein momentary surges in the flow rate would be critical to the operation of a blending or mixing type transport system.

The device 500 includes a material receiving hopper 502 into which quantities of sand 504 or other material to be transported is dumped from time to time. The hopper 502 is somewhat similar to the hopper shown in other figures of the drawings and previously described in this specification and includes a sloping bottom wall 504 which is joined to side walls 506 and a vertical front wall 508. The front wall 508 is provided with a discharge opening 508a at the lower portion thereof so that material in the hopper will flow downwardly and outwardly through the opening into a generally rectangular feeding chamber 510 disposed adjacent the front wall of the hopper. In order to control the flow of material from the hopper 502 into the feeding chamber 510, there is provided a movable gate 512 which may be secured to the front wall 508 in a plurality of different positions by means of wing nut and bolt assemblies 514. By lowering or raising the gate 512 the effective area of the opening 508a and hence the feed rate to the chamber 510 can be controlled.

The rectangular feed chamber 510 includes side walls 516, a top wall 518 and a front wall 520 which may be constructed of transparent material such as glass or plastic in order that material in the chamber can be viewed from the outside. The front wall 520 is removable from the structure and is held in place by a plurality of bolts 522 and a gasket 524 is provided for effecting a seal between the front wall and the other walls of the chamber. A baffle 526 is provided in the feed chamber to prevent material from building up against the front wall 520 and the baffle is also preferably constructed of transparent material as not to restrict the view into the chamber.

The lower end of the feed chamber 510 is generally open to permit material in the chamber to flow downwardly into a valve chamber 530 which is disposed directly therebelow. The upper end of the chamber 530 is provided with a mounting ring 532 formed of an angle and having a horizonal flange which is bolted to the lower end of the hopper 502 and a bottom wall 534 of the feed chamber. The bottom wall 534 is provided with an opening 534a to allow material to flow downwardly into the valve chamber and a gasket 536 is provided to effect a seal between the flange of the mounting ring 532 and the bottom wall and bottom of the hopper 502.

The chamber 530 is constructed of an upper portion 538 and lower portion 540 having flanges 538a and 540a, respectively, which are bolted together with a gasket 542 therebetween to effect a seal. The upper portion 538 has a cylindrical lower section and an inwardly directed conical portion at the upper end thereof which forms an upper, generally conical valve seating surface 544. The lower portion 540 is provided with a cylindrical upper portion and a lower, inwardly directed conical portion which forms a lower generally conical valve seating surface 546.

Within the valve chamber 530 there is provided a reciprocally movable valve member 550 which includes an upper resilient valve disk 552 which is spaced upwardly apart from a similar lower resilient valve disk 554. The disks 552 and 554 are secured on a valve rod 556 which is axially disposed in the valve chamber 530 and extends upwardly into the feeding chamber 510. The lower portion of the valve rod 556 is threaded to receive a plurality of nuts 558 and washers 559 which are provided to secure the valve disks on the rod in the proper spaced relation. As the valve disks or the conical seating surfaces wear during operation, the spacing of the disks can be adjusted as needed to provide for positive seating between the seating surfaces and the disks.

In order to provide for reciprocal movement of the valve element 550 within the valve chamber 530, the upper end of the valve rod 556 is connected to the lower end of a piston rod 560a of a pneumatic cylinder 560 which is mounted on the top wall 518. The valve rod 556 and piston rod 560a are connected together by means of a flexible coupling 562 in order to provide for limited lateral movement of the valve element 550 within the valve chamber so as to effect good seating between the disks and their respective conical seating surfaces.

When air pressure is supplied to the lower end of the cylinder 560, the valve member 550 moves upwardly. As this occurs, the upper valve disk 552 seats against the upper conical seating surface 544 preventing material from flowing into the valve chamber 530 from the feeding chamber 510. During this upward movement of the valve member, the lower valve disk 554 moves upwardly away from the lower seating surface 546 allowing material in the valve chamber 530 to flow downwardly out through the bottom outlet of the chamber.

When air pressure is no longer supplied to the lower end of the cylinder 560 or when air pressure is supplied to the upper end thereof, the valve member 550 moves downwardly. As this occurs the upper valve disk 552 moves downwardly away from seating engagement with the upper seating surface 544 allowing material in the feed chamber 510 to flow downwardly into the valve chamber 530. During this downward movement, the lower valve disk 554 moves downwardly into seating engagement with the lower seating surface 546 shutting off the flow from the chamber outwardly through the bottom outlet thereof.

Thus, as the valve member 550 is reciprocated within the chamber 530 by the cylinder 560, the upper and lower valve disks alternately seat against their respective seating surfaces in the chamber. This alternate seating of the valve disks allows material to first flow into the valve chamber from the feeding chamber and then from the valve chamber into the system. The flow rate from the chamber is dependent on a number of different things including, type, particle size and flowability of the material being fed, the size of the chamber, the pressure differential between the valve chamber and the feeding chamber and the system, the time duration of the upward and downward strokes of the valve member and the time intervals that the upper and lower valve disks are seated against their respective seats.

Directly below the discharge outlet of the valve chamber 530 and in communication therewith is provided a collecting chamber which may take the form of an elbow fitting 564, having a vertically extending generally cylindrical upper section 566 which transitions into a horizontally directed outlet 568 of reduced diameter. The upper end of the cylindrical section 566 is provided with a ring flange 566a which is bolted to a similar flange 540b provided at the lower end of the valve chamber and a sealing gasket 570 is disposed between the flanges to effect a tight seal therebetween.

The outlet 568 is connected to a flexible delivery tube 572 by means of a transition fitting 574 and the delivery tube 572 is connected to a transport duct 576 in which a flowing air stream is provided for transporting the solid material as it is introduced into the duct through the delivery tube. Preferably the delivery tube 572 and fitting 574 are constructed of flexible plastic material in order that the material flow may be visually observed therein.

In order to move material from the elbow fitting 564 into the transport duct 576 at a relatively even discharge rate, there is provided a pneumatic nozzle 580 which is disposed within an opening 582 provided in the elbow fitting opposite and axially aligned with the outlet 568. The nozzle 580 is axially movable within the opening 582 so that it can be positioned in the most advantageous position to best move the material in the elbow fitting out through the outlet 568, discharge tube 572 and into the transport duct 576. The most advantageous position will, of course, be dependent on a number of factors including the type, particles size and flowability of the material, the air pressure supplied to the nozzle and the various pressures prevailing in the valve chamber, elbow fitting and the transport duct and the amount of material discharged into the elbow fitting each time the valve member 550 moves upwardly to the position shown in FIG. 12.

It should be noted that the outlet 568 and delivery tube 572 are both of much smaller cross-sectional area than the cylindrical section 566 of the elbow fitting 564. Thus, when material in the valve chamber 530 is discharged into the elbow fitting 564, it cannot immediately flow in a large surge into the transport duct 576. The nozzle 580 provides for moving the material at a relatively even flow rate into the transport duct until the material in the elbow fitting is nearly exhausted at which time the valve member 550 again moves upward to discharge another quantity of material into the fitting from the valve chamber. The addition of the elbow fitting and air nozzle evens out the flow of material into the transport duct and prevents surges of material into the system each time the valve member moves upward to discharge material out of the valve chamber.

The air nozzle, in addition to smoothing out the flow, also aids in starting the flow initially and greatly increases the range of flow rates that can be obtained with the system. It has been found that flow rates as low as 0.1 lb. per hour are obtainable and materials having low flowability characteristics or high angles of repose can be utilized with the apparatus. Accurate control of flow rates is readily obtainable by adjusting the air pressure supplied to the air nozzle and by adjusting the position of the nozzle in the elbow fitting.

In order to aid the flow of material from the hopper 502 into the feeding chamber 510, the bottom wall 504 of the hopper is provided with an aerator assembly 580 and an air operated vibrator 582. The aerator assembly 580 includes an enclosure 584 which is supplied with compressed air from an air line 586. The bottom wall 504 of the hopper is provided with a plurality of holes 504a and above the holes is provided a screen 588 having a mesh fine enough to prevent the material in the hopper from passing through while allowing air to flow upward from the enclosure 584 into the hopper in order to aerate and agitate the material so it will flow freely from the hopper into the feed chamber 510. The vibrator 582 is supplied with compressed air from a line 590 and operates to vibrate the hopper 502 and connected assemblies to further aid in causing the material to freely flow from the hopper and feed chamber. The air lines 586 and 590 are connected to a common supply line 592 and regulator valves 594 and 596 are provided in the lines 586 and 590, respectively, to regulate the air pressure supplied to operate the aerator 580 and vibrator 582.

The common supply line 592 is connected to an upper branch line 598 which supplies compressed air to the upper end of the air cylinder 560 in order to cause a downward movement of the valve element 550. The upper branch line 598 is connected to one outlet of an air valve 600 which is electrically actuated by a solenoid winding 602. The lower end of the air cylinder 560 is connected to an alternate outlet of the solenoid valve 600 by means of a lower branch line 604; and when the valve supplies compressed air to this branch, the valve member 550 is moved upwardly to the position shown in FIG. 12.

Compressed air is supplied to an inlet port of the valve 600 from a supply manifold 606 which in turn is connected to a suitable source of compressed air such as an air compressor or compressed air tank (not shown) through supply line 608. The supply line 608 is provided with a shut off valve 610 for cutting off the air supply to the system and a regulator valve 612 for adjusting the air pressure into the supply manifold. A pressure gauge 614 is also provided in order that the regulator valve 612 can be adjusted to obtain the proper air pressure for the system.

The valve 600 is of the spring return type and when no current is supplied to the solenoid 602, the valve is positioned to supply air from the supply manifold 606 into the lower branch line 604 to maintain the valve member 550 in the upper position. While in this position, the upper end of the cylinder 560 is exhausted to the atmosphere through the upper branch line 598 and out an exhaust port 616 provided in the valve 600. Also, the aerator assembly 580 and vibrator 582 are inoperative during this time since their supply line 592 is connected to the upper branch line 598. It should also be noted that a lubricator 618 is positioned in the upper branch line 598 in order to lubricate the air cylinder 560.

When the solenoid 602 is electrically energized, the valve 600 is moved to connect the lower branch line 604 to the atmosphere through the exhaust port 616 and the upper branch line 598 to the supply line 606. When this happens, compressed air is supplied to the upper end of the cylinder 560 causing the valve member 550 to move downward and allow material to flow into the valve chamber 530 from the hopper 502 and feed chamber 510. Air pressure is also supplied to the aerator assembly 580 and vibrator 582 during this time to aid the material in freely flowing from the hopper 502 into the feed chamber 510 and valve chamber 530.

As the solenoid 602 of the valve 600 is energized and deenergized from electrical impulses supplied to the solenoid winding, the valve member 550 reciprocates up and down in the valve chamber 530 to alternately seat the valve disks 552 and 554 as previously described. By adjusting the air pressure in the system, the desired velocity of travel of the valve member can be obtained and by regulating the length of time of the electrical impulses to the solenoid 602 and the interval between successive impulses, the time interval during which either of the valve disks are seated can be effectively controlled. These factors, among others previously mentioned, establish the feed rate into and out of the valve chamber 530 for any given type of material being fed by the system.

The air nozzle 580 is connected to the main supply line 606 by means of a branch line 620. Within the line 620, there is provided an adjustable pressure regulator valve 622 which is adjustable to provide the desired operating pressure for the nozzle. A pressure gauge 624 is provided in order to assist in adjusting the pressure in the line 620 to the desired pressure. In order to provide controlling means for supplying compressed air to the nozzle for selected periods of time, a normally closed spring return type solenoid valve 626 is disposed in the line 620 ahead of the regulator valve 622. When the solenoid valve 626 is electrically energized by an electrical pulse of a predetermined time duration, the valve is opened to allow air flow to the nozzle for the selected time interval and at the end of the pulse, the valve returns to the closed position to shut off flow to the nozzle. By controlling the air pressure to the nozzle 580, the time interval during which the air pressure is supplied to the nozzle, and the position of the nozzle in the elbow fitting 564, the feed rate of material from the elbow fitting into the transport duct 576 can be accurately controlled.

In order to provide for flushing out the valve chamber 530 and additionally to aid in starting the flow of material out of the chamber after a prolonged period of shutdown, a flushing air line 628 is connected between the line 620 and the upper end of the valve chamber 530. Compressed air supplied to the valve chamber 530 from the flushing line 628 aids in causing material in the chamber to flow out into the elbow fitting 564 and into the transport duct 576. A solenoid valve 630, similar to the valve 626, is disposed within the flushing line 628 to control the air flow in the line so that air pressure can be supplied to flush the valve chamber at selected time periods. A pressure regulator valve 632 is provided in the flushing line to control the pressure of the flushing air supplied to the chamber and a check valve 634 is provided to prevent a back flow into the flushing line. A similar check valve 636 is also provided in the line 620 leading to the air nozzle 580 to prevent a back flow into the line from the elbow fitting of the feeder.

In order to adjustably control the flow rate of material from the feeding device 500 into the transport duct 576, there is provided an electrically operated timing system refered to generally by the reference numeral 640. The timing system 640 includes a first timer 642 (also labeled timer #1 on the drawing) which is selectively adjustable to send an electrical current to the solenoid valve 626 for a selected time duration via an electrical cable. When timer #1 starts on its timing cycle of selected duration, the normally closed valve 626 is opened allowing air pressure to flow to the nozzle 580 and move the material in the elbow fitting 564 out into the delivery tube 572 and transport duct 576. The total amount of flow for any given material and nozzle air pressure is dependent on the length of the time cycle of timer #1 and the timer is set so that it will time out when the material in the elbow fitting is just about exhausted. The electrical cable 644 may also be connected via a branch cable 646 to actuate the solenoid valve 630 for permitting air to flow into the upper portion of the valve chamber 530 through the flushing line 628 and thus air the nozzle 580 in moving material out of the valve chamber into the transport duct 576.

Timer #1 is electrically connected to a second timer 648 (also labeled timer #2 on the drawing) via an electrical cable 650 so that at the end of the timer cycle of timer #1, timer #2 is energized to begin its selected time cycle. When timer #2 starts its time cycle, electrical energy is supplied to the solenoid 602 of the valve 600 via an electrical cable 650 causing it to direct air pressure to the top side of the air cylinder 560 causing the valve member 550 to move downwardly to allow material to flow into the valve chamber 530 from the feeding chamber 510 and hopper 502. As soon as the selected time cycle of timer #2 comes to an end, the valve 690 is spring returned to again direct air pressure to the lower end of the air cylinder 560 and raise the valve member to the position shown in FIG. 12 allowing material in the valve chamber 530 to flow into the elbow fitting 564 for delivery by the nozzle 580 into the transport duct 576. The timer #2 is electrically connected to timer #1 via an electrical cable 552 so that as the end of the selected time interval of timer #2 is reached, timer #1 is energized to start another time cycle as before described.

The timer system 640 adjustably controls the movements of the valve member 550 in the desired selected synchronous relation with the operation of the air nozzle 580 to effect the desired selected feed rate of the device. Timer #1 controls the time interval during which air is supplied to the nozzle 580 and the period in which the valve member 550 dwells in the upper position of FIG. 12. Timer #2 controls the interval in which air is not supplied to the air nozzle 580 and the time period during which the valve member 550 dwells in the downward position. It is to be understood, of course, that more timers could be utilized to obtain overlapping of the time intervals during which air is supplied to the nozzle 580 and the downward dwell period of the valve member if desirable.

Since the total amount of material fed by the device over a given period of time is dependent upon the feed rate into the valve chamber 530 and since this rate is dependent on the dwell period of the valve member 550 in the lower position controlled by timer #2, a totalizing meter 554 is provided which adds up the time intervals of the timer #2 and hence, the totalizer can be calibrated to read the amount of material fed to the transport duct. The totalizer is connected to timer #2 by an appropriate electrical cable 556 and is only energized during the time in which timer #2 is supplying electrical energy to the solenoid 602.

By utilizing a small diameter delivery tube 572 and the air nozzle 580 for moving material into the transport duct 576, it is possible to discharge a large amount of material from the valve chamber 530 into the elbow fitting 564 without causing a large surge of material into the flow. The action of the air nozzle 580 evens out the flow into the transport duct and isolates it somewhat from the momentary surges of material when the lower valve disk 554 opens. The combination of the reciprocating valve member in the chamber and the air nozzle means in the elbow fitting coupled with the timing system for controlling the former and latter in selected synchronous relation with each other provide a feeding device that is useful in feeding many different types of materials at a wide range of high and low, relatively even feed rates. The system is not subject to clogging, is easy to start in operation after a period of shutdown and is easily controlled for the desired application.

While there have been shown and described several embodiments of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed as new and desired to be secured by Letters Patent of the United States is:

1. Apparatus for feeding granular material into a fluid conduit containing a moving fluid stream, said apparatus comprising a generally vertically extending valve chamber having an upper inlet, a lower discharge outlet, and a pair of vertically spaced-apart, gradually tapering, elongated, generally conical upper and lower valve seating surfaces in concentric arrangement about a central vertical axis of the chamber, a supply chamber disposed vertically above said valve chamber containing a supply of granular material and in communication with the inlet of said valve chamber, rod means extending downwardly into said valve chamber through the inlet thereof and having an upper end reciprocally movable along the central axis of said valve chamber, upper and lower, generally flat, substantially cylindrical, resilient valve disks arranged in vertically spaced-apart relation on the free end of said rod means and movable therewith transversely of said central axis for alternate self-aligned seating of the disks against the gradually tapering portion of the respective seating surfaces upon reciprocal movement of said rod means, a fluid cylinder mounted on said supply chamber above and coaxial with the central axis of said valve chamber, piston means reciprocally movable in said cylinder and operatively connected with the upper end of said rod means, means for selectively supplying pressurized fluid to said cylinder to reciprocate the piston means, a collecting chamber disposed below and in communication with the lower discharge outlet of said valve chamber for receiving material discharged therefrom, said collecting chamber including an outlet in communication with said fluid conduit, and nozzle means extending into and axially aligned with the outlet of said collecting chamber directing a stream of pressurized fluid into the material in said collecting chamber for moving said material into said fluid conduit.

2. Apparatus as defined in claim 1 wherein the cross-sectional area of the outlet of said collecting chamber is substantially smaller than that of the discharge outlet of said valve chamber.

3. Apparatus as defined in claim 1 wherein said collecting chamber comprises an elbow having a large upper end joined with said valve chamber discharge outlet and a small end forming the outlet of said collecting chamber and wherein said nozzle means is movable toward and away from the small end of said collecting chamber in axial alignment with said outlet for adjusting the flow rate of material therethrough.

4. Apparatus for feeding granular material into a fluid conduit containing a moving fluid stream, said apparatus comprising a generally vertically extending valve chamber having an upper inlet, a lower discharge outlet, and a pair of vertically spaced-apart, gradually tapering, elongated, generally conical upper and lower valve seating surfaces in concentric arrangement about a central vertical axis of the chamber, a supply chamber disposed vertically above said valve chamber containing a supply of granular material and in communication with the inlet of said valve chamber, rod means extending downwardly into said valve chamber through the inlet thereof and having an upper end reciprocally movable along the central axis of said valve chamber, upper and lower, generally flat, substantially cylindrical, resilient valve disks arranged in vertically spaced-apart relation on the free end of said rod means and movable therewith transversely of said central axis for alternate self-aligned seating of the disks against the gradually tapering portion of the respective seating surfaces upon reciprocal movement of said rod means, a fluid cylinder mounted on said supply chamber above and coaxial with the central axis of said valve chamber, piston means reciprocally movable in said cylinder and operatively connected with the upper end of said rod means, first means for selectively supplying pressurized fluid to said cylinder to reciprocate the piston means, a collecting chamber disposed below and in communication with the lower discharge outlet of said valve chamber for receiving material discharged therefrom, said collecting chamber including an outlet in communication with said fluid conduit, nozzle means extending into and axially aligned with the outlet of said collecting chamber directing a stream of pressurized fluid into the material in said collecting chamber for moving said material into said fluid conduit, and second means for supplying pressurized fluid to said nozzle means at selectively adjusted pressures.

5. Apparatus as defined in claim 4 including control means for actuating said first means and second means in selected synchronous relation with one another.

References Cited by the Examiner
UNITED STATES PATENTS

| | | | |
|---|---|---|---|
| 799,808 | 9/05 | Thompson | 302—55 |
| 898,012 | 9/08 | Shannon | 214—36 |
| 1,482,677 | 2/24 | Dunten | 214—17.4 |
| 2,723,057 | 11/55 | Golden | 302—55 |
| 2,915,336 | 12/59 | Vaell | 302—14 |
| 2,943,890 | 7/60 | Hrabouszky | 302—14 |
| 3,072,302 | 1/63 | Giovannoni | 222—453 |

FOREIGN PATENTS

| | | |
|---|---|---|
| 764,761 | 3/34 | France. |
| 1,210,036 | 9/59 | France. |
| 834,052 | 5/60 | Great Britain. |

SAMUEL F. COLEMAN, *Primary Examiner.*

ANDRES H. NIELSEN, *Examiner.*

UNITED STATES PATENT OFFICE
CERTIFICATE OF CORRECTION

Patent No. 3,197,261　　　　　　　　　　　　　　　July 27, 1965

John H. Kauffman

It is hereby certified that error appears in the above numbered patent requiring correction and that the said Letters Patent should read as corrected below.

Column 2, line 24, for "chamebr" read -- chamber --; column 3, line 26, for "secional" read -- sectional --; column 5, line 58, for "position" read -- positions --; column 6, line 30, for "secs," read -- secs. --; column 9, line 6, for "period" read -- air pressure --; line 27, for "end" read -- ends --; column 18, line 48, for "refered" read -- referred --.

Signed and sealed this 18th day of January 1966.

(SEAL)
Attest:

ERNEST W. SWIDER
Attesting Officer

EDWARD J. BRENNER
Commissioner of Patents